United States Patent
Guillou et al.

(10) Patent No.: US 11,236,275 B2
(45) Date of Patent: Feb. 1, 2022

(54) METHOD FOR ADDING AN ORGANIC COMPOUND TO A POROUS SOLID IN THE GASEOUS PHASE

(71) Applicant: IFP Energies Nouvelles, Rueil-Malmaison (FR)

(72) Inventors: Florent Guillou, Ternay (FR); P-Louis Carrette, Lyons (FR); Bertrand Guichard, Saint Genis Laval (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 166 days.

(21) Appl. No.: 16/610,155

(22) PCT Filed: Apr. 24, 2018

(86) PCT No.: PCT/EP2018/060406
§ 371 (c)(1),
(2) Date: Nov. 1, 2019

(87) PCT Pub. No.: WO2018/202467
PCT Pub. Date: Nov. 8, 2018

(65) Prior Publication Data
US 2020/0071625 A1 Mar. 5, 2020

(30) Foreign Application Priority Data

May 4, 2017 (FR) ...................................... 1753921

(51) Int. Cl.
*C10G 45/08* (2006.01)
*B01J 27/19* (2006.01)
(Continued)

(52) U.S. Cl.
CPC .............. *C10G 45/08* (2013.01); *B01J 27/19* (2013.01); *B01J 31/34* (2013.01); *B01J 35/1009* (2013.01);
(Continued)

(58) Field of Classification Search
None
See application file for complete search history.

(56) References Cited

U.S. PATENT DOCUMENTS 6,288,006 B1 9/2001 Arretz
6,858,192 B2 2/2005 Graham et al.
(Continued)

FOREIGN PATENT DOCUMENTS

| EP | 0958054 B1 | 3/2001 |
| EP | 2289609 A1 | 3/2011 |
| JP | 2008307475 A | * 12/2008 |

OTHER PUBLICATIONS

International Search Report dated Jun. 19, 2018 issued in corresponding PCT/EP2018/060406 application (2 pages).

*Primary Examiner* — Randy Boyer
*Assistant Examiner* — Juan C Valencia
(74) *Attorney, Agent, or Firm* — Millen, White, Zelano and Branigan, P.C.; Harry B. Shubin (57) ABSTRACT

The invention relates to a process for adding an organic compound to a porous solid wherein the porous solid and the organic compound in the liquid state are brought together simultaneously, without physical contact between the solid and the organic compound in the liquid state, at a temperature below the boiling point of the organic compound and under pressure and time conditions such that a fraction of said organic compound is transferred gaseously to the porous solid.

16 Claims, 2 Drawing Sheets

(51) Int. Cl.
*B01J 31/34* (2006.01)
*B01J 35/10* (2006.01)
*B01J 37/02* (2006.01)
*B01J 37/20* (2006.01)

(52) U.S. Cl.
CPC ....... *B01J 35/1014* (2013.01); *B01J 35/1019* (2013.01); *B01J 35/1038* (2013.01); *B01J 35/1042* (2013.01); *B01J 35/1047* (2013.01); *B01J 37/0203* (2013.01); *B01J 37/0236* (2013.01); *B01J 37/0238* (2013.01); *B01J 37/20* (2013.01); *C10G 2300/1055* (2013.01); *C10G 2300/202* (2013.01); *C10G 2300/301* (2013.01); *C10G 2300/308* (2013.01); *C10G 2300/4018* (2013.01); *C10G 2300/70* (2013.01); *C10G 2400/04* (2013.01)

(56) References Cited

U.S. PATENT DOCUMENTS

| | | |
|---|---|---|
| 7,022,269 B2 | 4/2006 | Graham et al. |
| 7,241,430 B2 | 7/2007 | Graham et al. |
| 7,563,311 B2 | 7/2009 | Graham |
| 2001/0048970 A1* | 12/2001 | Hagemeyer .......... B01J 37/0221 427/217 |
| 2002/0082168 A1 | 6/2002 | Graham et al. |
| 2005/0100491 A1 | 5/2005 | Graham et al. |
| 2006/0162558 A1 | 7/2006 | Graham et al. |
| 2008/0006157 A1 | 1/2008 | Graham |
| 2017/0216769 A1* | 8/2017 | England ................. B01J 20/20 |

* cited by examiner

METHOD FOR ADDING AN ORGANIC COMPOUND TO A POROUS SOLID IN THE GASEOUS PHASE

The present invention relates to a process for adding an organic compound to a porous solid, in particular to a porous catalyst support. The process according to the invention may be incorporated into a process for preparing a heterogeneous catalyst said to be "additivated" with an organic compound and comprising a porous support on which at least one metal from group VI and/or at least one metal from group VIII is deposited.

STATE OF THE ART

Conventional hydrotreating catalysts generally comprise a support based on an oxide of a metal (for example aluminum) or of a metalloid (for example silicon) and an active phase based on at least one metal from group VIB and/or on at least one metal from group VIII in the oxide forms thereof and optionally phosphorus. The preparation of these catalysts generally comprises a step of impregnating the metals and the phosphorus on the support, optionally followed by a maturing step, followed by drying or a calcining enabling the active phase to be obtained in the form of oxides. Before the use thereof in a hydrotreating and/or hydrocracking reaction, these catalysts are generally subjected to a sulfidation in order to form the active species in sulfide form.

The addition of an organic compound to the hydrotreating catalysts in order to improve their activity has been recommended by those skilled in the art, notably for catalysts which have been prepared by impregnation optionally followed by a maturing step, and followed by a drying step. Many documents describe the use of various ranges of organic compounds, such as nitrogen-containing organic compounds and/or oxygen-containing organic compounds.

One family of compounds now well known from the literature relates to chelating nitrogen-containing compounds (EP 181035, EP 1043069 and U.S. Pat. No. 6,540,908) with, by way of example, ethylenediaminetetraacetic acid (EDTA), ethylenediamine, diethylenetriamine or nitrilotriacetic acid (NTA).

In the family of oxygen-containing organic compounds the use of monools, diols or polyols which are optionally etherified is described in documents WO96/41848, WO01/76741, U.S. Pat. Nos. 4,012,340, 3,954,673, EP 601722 and WO 2005/035691. The prior art mentions less frequently compounds comprising ester functions (EP 1046424, WO2006/077326).

Several patents are also found that claim the use of carboxylic acids (EP 1402948, EP 482817). In particular, in document EP 482817, citric acid, and also tartaric, butyric, hydroxyhexanoic, malic, gluconic, glyceric, glycolic and hydroxybutyric acids have been described.

The processes for preparing additivated catalysts generally use an impregnation step in which the organic compound is introduced so as to fill the entire porosity of the support, optionally impregnated with metal precursors, in order to obtain a homogeneous distribution. This results in using large amounts of organic compound or in diluting the organic compound in a solvent. After impregnation, a drying step is then necessary to eliminate the excess organic compound or the solvent and thus free the porosity needed for the use of the catalyst. Added to the additional cost linked to the excess organic compound or to the use of a solvent is the cost of an additional, energy-consuming, drying step.

Document CN 102463151 describes a process for the heat treatment of a catalyst support comprising a metal phase in a gaseous atmosphere comprising the organic compound which is therefore in the gaseous state. The heat treatment is thus carried out at a temperature above the boiling point of said organic compound. According to document CN 102463151, the heat treatment is carried out at a temperature between from 150 to 500° C. This process is not without risk in the implementation thereof. Specifically, for many organic compounds, such as for example the ethylene glycol cited in this document, the flash point is below the boiling point. There is therefore a risk of fire when working at a temperature above the boiling point. Furthermore, a high temperature may also lead to a partial or complete decomposition of the additive greatly reducing its effect. For example citric acid, commonly used as an organic additive (US 2009/0321320), decomposes at 175° C. whereas its boiling point is 368° C. at atmospheric pressure.

One objective of the invention is therefore to propose an alternative process for depositing an organic compound on a porous catalyst support that does not require a step of impregnating the support by means of a solution containing the organic compound and which is safer and less expensive in the industrial implementation thereof.

SUMMARY OF THE INVENTION

The present invention relates to a process for adding an organic compound to a porous solid comprising a step a) wherein the porous solid and the organic compound in the liquid state are brought together simultaneously and without physical contact between the solid and the organic compound in the liquid state, at a temperature below the boiling point of the organic compound and under pressure and time conditions such that a fraction of said organic compound is transferred gaseously to the porous solid.

The process for adding the organic compound according to the invention does not involve a conventional step of impregnation using a solution containing a solvent in which the organic compound is diluted. Consequently, it is not necessary to carry out a step of drying the solid with a view to eliminating the solvent, hence a process that is more economical in terms of hot utility and raw material. According to the invention, the step of adding the organic compound is carried out at a temperature below the boiling point of said organic compound, hence a substantial gain from an energy point of view and in terms of safety compared to the implementation described in document CN 102463151. The process according to the invention is also characterized by the fact that the addition of the organic compound to the porous solid is carried out without physical contact with the organic compound in the liquid state, i.e. without impregnation of the porous solid by the liquid. The process is based on the principle of the existence of a vapor pressure of the organic compound which is generated by its liquid phase at a given temperature and a given pressure. Thus, a portion of the molecules of organic compound in the liquid state passes into the gaseous state (vaporization) and is then transferred (gaseously) to the porous solid. This bringing-together step a) is carried out for a time sufficient to attain the targeted content of organic compound in the porous solid.

Advantageously, step a) is carried out by means of a unit for adding said organic compound comprising a first compartment and a second compartment that are in communication so as to allow the passage of a gaseous fluid between the compartments, the first compartment containing the porous solid and the second compartment containing the organic compound in the liquid state. According to one embodiment, the unit comprises a chamber that includes the first and second compartments, the two compartments being in gaseous communication.

According to another embodiment, the unit comprises two chambers that respectively form the first and second compartments, the two chambers being in gaseous communication.

Advantageously, step a) of bringing the porous solid together with the organic compound in the liquid state is carried out in the presence of a stream of a carrier gas flowing from the second compartment into the first compartment.

Generally, step a) is carried out at an absolute pressure of between 0 and 1 MPa.

Preferably, the operating temperature of step a) is below 200° C., preferably between 10° C. and 150° C., more preferably between 25° C. and 120° C.

Advantageously, in step a), a gaseous effluent containing said organic compound is withdrawn from the first compartment and the effluent is recycled to the first and/or the second compartment.

According to one embodiment, in step a), a gaseous effluent containing said organic compound in the gaseous state is withdrawn from the first compartment, said effluent is condensed so as to recover a liquid fraction containing the organic compound in the liquid state and said liquid fraction is recycled to the second compartment.

According to the invention, the porous solid is chosen from a catalyst support and a catalyst support further comprising at least one metal from group VIB and/or at least one metal from group VIII. Preferably, the porous support is based on an oxide of a metal and/or of a metalloid. Preferably, the porous support is based on alumina and/or silica.

The organic compound which is used in the process is chosen from organic molecules containing oxygen and/or nitrogen and/or sulfur.

The invention also relates to a process for preparing a catalyst comprising a porous support, at least one metal from group VIB and/or at least one metal from group VIII and at least one organic compound, which comprises at least the following steps:

i) depositing the organic compound on the porous support using the process according to the invention;

Ii) depositing at least one metal from group VIB and/at least one metal from group VIII on the porous support by bringing the support into contact with a solution containing at least one precursor of said metal(s) from group VIII and/or at least one precursor of said metal(s) from group VIB;

iii) drying the solid obtained at the end of step ii), step i) being carried out before or after steps ii) and iii).

According to the invention, the solution of step ii) may further comprise at least one additional organic compound different from the organic compound used in step i).

The process according to the invention for preparing a catalyst may further comprise at least one step of impregnating the porous support with a solution comprising an organic compound different from the organic compound used in step i).

Lastly, the present invention relates to a process for treating a hydrocarbon feedstock wherein hydrogen, the hydrocarbon feedstock and a catalyst are brought into contact, at a temperature between 180° C. and 450° C., at a pressure between 0.5 and 30 MPa, with an hourly space velocity of between 0.1 and 20 h-1 and with a hydrogen/feedstock ratio expressed as volume of hydrogen, measured under normal temperature and pressure conditions, per volume of liquid feedstock of between from 50 l/l to 5000 l/l, said catalyst having been prepared by a process according to the invention and subjected to at least one sulfiding step.

DETAILED DESCRIPTION OF THE INVENTION

One subject of the present invention is a process for adding an organic compound to a porous solid which is for example a porous catalyst support or a porous support which already contains at least one metal from group VIB and/or at least one metal from group VIII that will be denoted by the term "catalyst precursor" in the remainder of the description. The porous support is preferably based on at least one oxide of a metal or of a metalloid. Preferably, the porous support is based on alumina or silica or silica-alumina.

When the support is based on alumina, it contains more than 50% by weight of alumina. Preferably, the alumina is gamma alumina.

Alternatively, the support is a silica-alumina, i.e. it contains at least 50% by weight of alumina.

The content of silica in the support is at most 50% by weight, usually less than or equal to 45% by weight, preferably less than or equal to 40% by weight.

When the support of said catalyst is based on silica, it contains more than 50 percent by weight of silica and, generally, it contains only silica.

According to one particularly preferred variant, the support consists of alumina, silica or silica-alumina.

The support may also advantageously further contain from 0.1% to 50% by weight of zeolite. Preferably, the zeolite is chosen from the group FAU, BEA, ISV, IWR, IWW, MEI, UWY and preferably, the zeolite is chosen from the group FAU and BEA, such as the Y and/or beta zeolite.

In certain particular cases, the support may contain at least one dopant element, such as for example phosphorus.

The porous solid preferably has a total pore volume of between 0.1 and 1.5 cm$^3$/g, preferably between 0.4 and 1.1 cm$^3$/g. The total pore volume is measured by mercury porosimetry according to the standard ASTM D4284 with a wetting angle of 140°, such as described in the book by Rouquerol F.; Rouquerol J.; Singh K., "Adsorption by Powders & Porous Solids: Principle, methodology and applications", Academic Press, 1999, for example by means of an Autopore III™ model device from the brand Micromeritics™.

The specific surface area of the porous solid is advantageously between 5 and 400 m$^2$/g, preferably between 10 and 350 m$^2$/g, more preferably between 40 and 350 m$^2$/g. The specific surface area is determined in the present invention by the BET method according to the standard ASTM D3663, method described in the same book cited above.

The porous solid is generally in the form of beads, of extrudates, of pellets or of irregular and nonspherical agglomerates, the specific shape of which may result from a crushing step.

As mentioned above, the process for adding the organic compound may be carried out on a porous solid which is a catalyst precursor, i.e. on a porous support further comprising at least one metal from group VIB and/or at least one metal from group VIII. The groups of chemical elements are given according to the CAS classification (CRC Handbook of Chemistry and Physics, published by CRC Press, Editor in Chief D. R. Lide, 81st edition, 2000-2001). For example, Group VIII according to the CAS classification corresponds to the metals of columns 8, 9 and 10 according to the new IUPAC classification.

Within the context of the invention, the catalyst precursor may be a precursor of fresh catalyst, i.e. that has not been used beforehand in a catalytic unit and notably in hydrotreating and/or hydrocracking.

The catalyst precursor according to the invention may also be a so-called "regenerated" catalyst. The term "regenerated catalyst" denotes a catalyst which has been previously used in a catalytic unit and notably in hydrotreating and/or hydrocracking and which has been subjected to at least one calcining step in order to burn off the coke (regeneration).

The process for adding an organic compound to a porous solid may be carried out in a unit for addition of said organic compound. The addition unit used comprises a first compartment and a second compartment that are in communication so as to allow the passage of a gaseous fluid between the two compartments and in which the first compartment is suitable for containing the porous solid and the second compartment is suitable for containing the organic compound in liquid form. The process comprises a step a) wherein the porous solid and the organic compound in liquid form are brought together simultaneously without physical contact between the solid and the organic compound in liquid form, at a temperature below the boiling point of the organic compound and under pressure and time conditions such that a fraction of said organic compound is transferred gaseously to the porous solid by circulation of a stream of organic compound in gaseous form from the second compartment into the first compartment, so as to ultimately provide a porous solid containing the organic compound.

According to one embodiment, the bringing-together unit comprises a chamber that includes the first and second compartments, the compartments being in gaseous communication. For example, the compartments are arranged side by side and separated by a partition, for example a substantially vertical partition, attached to the bottom of the chamber and extending only over a fraction of the height of the chamber so as to allow the gaseous overhead to diffuse from one compartment to the other. Alternatively, the compartments are arranged one on top of the other and are in communication so as to allow the passage of the organic compound in the gaseous state between the two compartments. Preferably, the chamber is closed.

According to another embodiment, the unit comprises two chambers that respectively form the first and second compartments, the two chambers being in gaseous communication, for example by means of a duct. Preferably, the two chambers are closed.

Preferably, the compartment intended to contain the liquid organic compound comprises means for setting said liquid in motion in order to facilitate the transfer of the organic compound in the gaseous state from one compartment to the other. According to one preferred embodiment, the two compartments comprise means for respectively setting the liquid and the porous solid in motion. Advantageously, the compartment containing the organic compound in the liquid state is equipped with internals intended to maximize the surface area of the gas/liquid interface. These internals are for example porous monoliths impregnated by capillary action, falling films, packings or any other means known to those skilled in the art.

In one preferred embodiment, step a) of bringing the porous solid together with the organic compound is carried out in the presence of a (carrier) gas flowing from the second compartment into the first compartment so as to entrain the organic molecules in the gaseous state into the compartment containing the porous solid. For example, the carrier gas may be chosen from carbon dioxide, ammonia, air with a controlled moisture content, an inert gas such as argon, nitrogen, hydrogen, natural gas or a refrigerant gas according to the classification published by IUPAC.

According to a preferred embodiment, step a) comprises a step in which a gaseous effluent containing said organic compound is withdrawn from the first compartment and the effluent is recycled to the first and/or the second compartment.

According to another embodiment, a gaseous effluent containing said organic compound in the gaseous state is withdrawn from the first compartment, said effluent is condensed so as to recover a liquid fraction containing the organic compound in the liquid state and said liquid fraction is recycled to the second compartment.

The bringing-together step is preferably carried out at an absolute pressure of between 0 and 1 MPa. As specified above, the temperature of the bringing-together step is set at a temperature below the boiling point of the organic compound. The temperature of the bringing-together step is generally below 200° C., preferably between 10° C. and 150° C., more preferably between 25° C. and 120° C.

According to the invention, any organic compound may be used on condition that said organic compound is in the liquid state under the temperature and pressure conditions used in step a). The organic compound may be chosen, for example, from organic molecules containing oxygen and/or nitrogen and/or sulfur. The organic compound is, for example, chosen from a compound comprising one or more chemical functions chosen from a carboxylic, alcohol, thiol, thioether, sulfone, sulfoxide, ether, aldehyde, ketone, ester, carbonate, amine, nitrile, imide, oxime, urea and amide function. By way of example, it may be chosen from triethylene glycol, diethylene glycol, ethylene glycol, propylene glycol, diethylene glycol monomethyl ether, diethylene glycol monobutyl ether, ethylene glycol monobutyl ether, 1,4-butanediol, 1-pentanol, malonic acid, succinic acid, γ-ketovaleric acid, maleic acid, citric acid, alanine, glycine, iminodiacetic acid, nitrilotriacetic acid, orthophthalic acid, diethylformamide, dimethylformamide, methyl acetoacetate, dimethyl succinate, 2-methoxyethyl 3-oxobutanoate, 2-(methacryloyloxy)ethyl 3-oxobutanoate, γ-valerolactone, 4-hydroxyvaleric acid, 2-pentenoic acid, 3-pentenoic acid, 4-pentenoic acid, 2-acetylbutyrolactone, 2-(2-hydroxyethyl)-3-oxobutanoic acid, 3-hydroxy-2-(2-hydroxyethyl)-2-butenoic acid, N-methylpyrrolidone, propylene carbonate, sulfolane, diethyl phosphite, triethyl phosphite, triethyl phosphate, acetophenone, tetramethylurea, thioglycolic acid. Within the context of the invention, it is also possible to use a composition consisting of a mixture of organic compounds in the liquid state.

The process for adding the organic compound according to the invention may be incorporated into a line for producing catalyst said to be "additivated" with an organic compound.

According to a second aspect, the present invention relates to a process for preparing a catalyst additivated with an organic compound comprising a porous support, at least one metal from group VIB and/or at least one metal from group VIII and at least one organic compound, the process comprising at least the following steps:

i) depositing the organic compound on the porous support using the process according to the invention;
  ii) depositing at least one metal from group VIB and/or at least one metal from group VIII on the support by bringing the porous support into contact with a solution containing at least one precursor of at least one metal from group VIII and/or at least one precursor of at least one metal from group VIB;

iii) drying the solid obtained at the end of step ii), step i) being carried out before or after steps ii) and iii).

The process for adding the organic compound according to the invention may be carried out one or more times in an additivated catalyst production line in order to introduce one or more organic compounds before the step of impregnation of the active metal phase, and/or to enable the introduction of one or more organic compounds on a porous support that already contains an active metal phase which may optionally be sulfided.

According to a first embodiment A) of the process for preparing a catalyst additivated with an organic compound, the porous support is subjected to a step of impregnation with a solution comprising at least one metal from group VIB and/or at least one metal from group VIII so as to deposit an active metal phase (step ii). The porous support impregnated with the active metal phase is optionally subjected to a maturing step then is dried (step iii) in order to eliminate the solvent introduced by step ii). The dried porous support containing the active metal phase is treated according to step i) in the unit for bringing together with the organic compound in the liquid state so as to provide a catalyst additivated with said organic compound.

In the embodiment A), the porous support may notably already contain an additional organic compound different from the one which is used in step i). This additional organic compound may have been incorporated in the support by means of the addition process according to the invention or according to any other method known to those skilled in the art such as for example by impregnation of a solution containing the additional organic compound.

According to another embodiment B) for preparing a catalyst additivated with an organic compound, a catalyst support is used that does not contain an active phase. The support is firstly subjected to a step of adding the organic compound according to the invention so as to provide a catalyst support additivated with the organic compound (step i), which, after an optional maturing phase, is sent to the step of impregnation of the active phase (step ii). This step may consist in bringing the additivated support into contact with a solution containing at least one precursor of at least one metal from group VIII and/or at least one precursor of at least one metal from group VIB. The additivated catalyst thus obtained is optionally left maturing and then subjected to a drying step (step iii) with a view to eliminating the solvent introduced during the step of impregnation of the metal precursors of the active phase. In this embodiment B), the porous support used may optionally already contain an additional organic compound different from the one used in step i), the additional organic compound having been incorporated into the catalyst support using the addition process according to the invention or according to any other method known to those skilled in the art.

It should be noted that irrespective of the embodiments A) and B), step ii) of depositing the active metal phase may use a solution containing at least one precursor of at least one metal from group VIII and/or at least one precursor of at least one metal from group VIB and in addition one or more additional organic compounds different from the one from step i).

According to the invention, the additivated catalyst obtained at the end of steps i) to iii) described above may also be treated by one or more subsequent steps in order to incorporate one or more other additional organic compounds different from the one used in step i). The incorporation of one or more other different additional organic compounds may be carried out using the addition process according to the invention or according to any other method known to those skilled in the art. Said additional organic compound(s) may for example be introduced according to one of the embodiments described in document FR 3 035 008.

The catalysts according to the invention may contain, as active phase, one or more metals from group VIB and/or from group VIII. The preferred metals from group VIB are molybdenum and tungsten and the preferred metals from group VIII are non-noble elements and in particular cobalt and nickel. Advantageously, the active phase is chosen from the group formed by the combinations of the elements cobalt-molybdenum, nickel-molybdenum, nickel-tungsten or nickel-cobalt-molybdenum, or nickel-molybdenum-tungsten.

According to the invention, the catalysts generally have a total content of metal from group VIB and/or from group VIII of greater than 6% by weight expressed as oxide relative to the total weight of dry catalyst.

Preferably, the total content of metals from group VIB is between 5% and 40% by weight, preferably between 8% and 35% by weight, and more preferably between 10% and 32% by weight expressed as oxide of metal from group VIB relative to the total weight of dry catalyst.

The total content of metals from group VIII is generally between 1% and 10% by weight, preferably between 1.5% and 9% by weight, and more preferably between 2% and 8% by weight expressed as oxide of metal from group VIII relative to the total weight of dry catalyst.

The molar ratio of metals from group VIII to metals from group VIB in the catalyst is preferentially between 0.1 and 0.8, preferably between 0.15 and 0.6 and more preferably still between 0.2 and 0.5.

The catalyst may also comprise phosphorus as dopant. The content of phosphorus in said catalyst is preferably between 0.1% and 20% by weight expressed as $P_2O_5$, preferably between 0.2% and 15% by weight expressed as $P_2O_5$, and very preferably between 0.3% and 11% by weight expressed as $P_2O_5$ relative to the total weight of dry catalyst.

The molar ratio of phosphorus to metals from group VIB in the catalyst is greater than or equal to 0.05, preferably greater than or equal to 0.07, preferably between 0.08 and 1, preferably between 0.01 and 0.9 and very preferably between 0.15 and 0.8.

The catalyst may advantageously further contain at least one dopant chosen from boron, fluorine and a mixture of boron and fluorine. When the catalyst contains boron, the boron content is preferably between 0.1% and 10% by weight expressed as boron oxide, preferably between 0.2% and 7% by weight, and very preferably between 0.2% and 5% by weight relative to the total weight of dry catalyst. When the catalyst contains fluorine, the fluorine content is preferably between 0.1% and 10% by weight expressed as fluorine, preferably between 0.2% and 7% by weight, and very preferably between 0.2% and 5% by weight relative to the total weight of dry catalyst.

The additivated catalysts thus prepared are notably used for reactions for hydrotreating hydrocarbon feedstocks such as petroleum cuts or for the synthesis of hydrocarbons from synthesis gas. According to the invention, the term "hydrotreating" notably encompasses the reactions of total or selective hydrogenation, hydrodenitrogenation, hydrodearomatization, hydrodesulfurization, hydrodeoxygenation, hydrodemetallization, and hydrocracking of hydrocarbon feedstocks.

For hydrotreating applications, the additivated catalyst generally undergoes a sulfiding step before the use thereof. The feedstocks used in the hydrotreating process are for example gasolines, gas oils, vacuum gas oils, atmospheric residues, vacuum residues, atmospheric distillates, vacuum distillates, heavy fuel oils, oils, waxes and paraffins, used oils, deasphalted residues or crudes, feedstocks originating from thermal or catalytic conversion processes, lignocellulosic feedstocks, or feedstocks derived from biomass, taken alone or as a mixture. The operating conditions used in the processes carrying out reactions for hydrotreating hydrocarbon feedstocks described above are generally the following: the temperature is advantageously between 180° C. and 450° C., and preferably between 250° C. and 440° C., the pressure is advantageously between 0.5 and 30 MPa, and preferably between 1 and 18 MPa, the hourly space velocity is advantageously between 0.1 and 20 $h^{-1}$ and preferably between 0.2 and 5 $h^{-1}$, and the hydrogen/feedstock ratio expressed as a volume of hydrogen, measured under normal temperature and pressure conditions, per volume of liquid feedstock is advantageously between 50 l/l to 5000 l/l and preferably between 80 to 2000 l/l.

BRIEF DESCRIPTION OF THE FIGURES

Other features and advantages of the invention will become apparent on reading the description of particular exemplary embodiments of the invention, given solely by way of illustration and without limitation, and with reference to the following figures.

Generally, similar elements are indicated by identical references in the figures.

Figure 1:
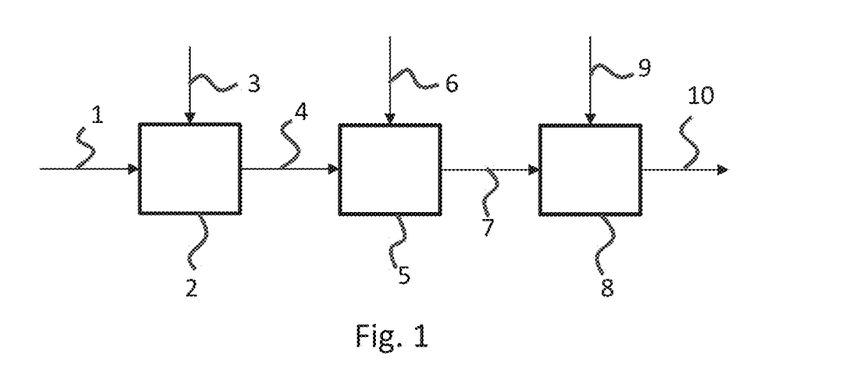
FIG. 1 is a diagram illustrating the principle of adding an organic compound according to standard practice known to a person skilled in the art.

FIG. 1 corresponds to a block diagram presenting a known process for adding an organic compound to a porous catalyst support or a catalyst precursor as described previously that is denoted hereinbelow by the generic term "solid".

The batch of solid 1 is subjected to an optional pretreatment in a unit 2 for pretreatment of the solid intended, if need be, to condition the solid before the step of impregnation of the organic compound. This pretreatment step may, for example and depending on the desired effect, be a preliminary drying step in order to adjust the residual moisture content.

This pretreatment may also be an addition by controlled addition of the same solvent, introduced through the line 3, as the one which is used during the impregnation of the organic compound in order to avoid too lively a reaction of the solid during the organic compound impregnation phase. The type of reaction that it is desired to avoid is for example a great release of heat linked to the sudden adsorption of the solvent (such as water for example) on the active sites of the solid.

The batch of solid 4 resulting from the pretreatment step is sent to a unit 5 for impregnation of the organic compound. According to the prior art, this step uses a solution containing a solvent, for example water, in which the organic compound to be impregnated is dissolved. In FIG. 1, the impregnation solution is conveyed via the line 6. The impregnation is carried out according to any method known to a person skilled in the art and for example by a dry impregnation. In this impregnation method, the solid set in motion is subjected to a jet of the impregnation solution, the volume of solution sprayed generally being equivalent to the accessible pore volume of the solid to be impregnated. In accordance with prior art practice, the impregnated solid is discharged via the line 7 into a drying unit 8 in order to eliminate the solvent which was incorporated in the solid at the same time as the organic compound. The stream 9 represents the hot utility that is used to dry the solid, which is for example hot air. This results in a dried porous solid 10 comprising the chosen organic compound.

Depending on the organic compound chosen and its solubility in the solvent used during the impregnation step, it is possible that the amount introduced is not sufficient at the end of a single impregnation step. In which case, use may be made of several impregnation and drying steps described above.

After impregnation of the organic compound, the porous solid may undergo one or more steps of impregnation of one or more metals from group VIB and/or from group VIII in order to deposit an active metal phase. The step(s) of impregnation of the metal(s) may be followed, optionally after a maturing step, by a step of drying at a moderate temperature, generally below 200° C.

Figure 2:
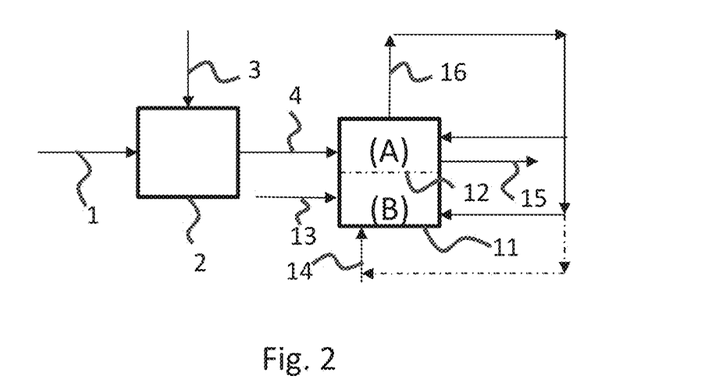
FIG. 2 is a diagram illustrating the process according to the invention for adding an organic compound according to a first embodiment.

FIG. 2 represents a block diagram of the process for adding the organic compound according to the invention which consists in bringing together, in a unit 11, the porous solid to be treated with the organic compound in the liquid state, the bringing together being carried out without physical contact between the porous solid and the liquid phase.

With reference to FIG. 2, the porous solid 1 is optionally sent to a pretreatment unit 2 as mentioned above. The pretreatment may consist of a step of drying the solid for example when this porous solid is a catalyst precursor obtained by impregnation of a solution containing at least one metal from group VIB and/or at least one metal from group VIII. The porous solid 4 resulting from the pretreatment is conveyed to a unit 11 for bringing the solid together with the organic compound in the liquid state. With reference to FIG. 2, the unit 11 comprises a chamber divided into two compartments A and B which are separated from one another by a partition means 12, the two compartments being in communication so as to allow the passage of a gaseous stream of organic compound so that the compartments A and B share the same gaseous atmosphere. In this embodiment, compartment A is suitable for receiving the porous solid 4 whilst compartment B is suitable for receiving the liquid organic compound. In the embodiment from FIG. 2, the partition means 2 may be a perforated plate enabling the passage of the gaseous fluid.

This bringing-together step is carried out in a controlled manner, at a temperature below the boiling point of said organic compound. Under these conditions, there is a vapor pressure of the organic compound which is generated by its liquid phase. Thus, a portion of the molecules of organic compound in the liquid state passes into gaseous form (vaporization) and is then transferred (gaseously) to the porous solid. Given that the organic compound vapor phase is gradually consumed by the solid, the liquid continues to vaporize. According to one embodiment, referred to as "batch" mode, the amount of liquid organic compound contained in compartment B is at least greater than the amount of the organic compound that it is desired to introduce into the porous solid. Alternatively, it is possible to continuously supply the organic compound in the liquid state as it is consumed by the porous solid or semi-continuously with a regular intermittent supply so as to maintain a minimum liquid level in compartment B. In FIG. 2, the makeup of organic compound in the liquid state is ensured via a duct 13.

The bringing-together step according to the invention may be carried out by maintaining a stirring of the liquid in compartment B and/or by setting in motion the solid to be treated in compartment A.

According to one preferred embodiment, the bringing-together step is carried out with a forced circulation of a stream of a gas, from compartment B containing the organic compound in the liquid state toward compartment A containing the porous solid to be additivated. As nonlimiting example, the stream of a gas may be carbon dioxide, ammonia, air with a controlled moisture content, an inert gas such as argon, nitrogen, hydrogen, natural gas or a refrigerant gas according to the classification published by IUPAC. The gas is either provided under pressure, or pressurized in order to overcome the pressure drops induced by the circuit by means of equipment for increasing the pressure of a gas such as a compressor or a fan. Preferably, the gas is injected via the line 14 into the liquid so as to ensure the stirring thereof in order to promote the saturation of the gas phase by the organic compound, increasing the gas/liquid exchange area.

The bringing-together step is carried out under controlled time, temperature and pressure conditions so as to ultimately provide a solid 15 containing the organic compound. Without being bound to a particular theory, the introduction of the organic compound into the porous solid may result from a capillary condensation and/or adsorption process.

As indicated in FIG. 2, the bringing together according to the invention may involve a recycling of the vapor phase extracted from compartment A via the line 16 leading into compartment A and/or into compartment B or optionally into the line 14. Alternatively, the gas phase 16 extracted from compartment A is cooled so as to condense the organic compound in liquid form which is thus recycled to compartment B via a line or optionally via the line 13.

Figure 3:
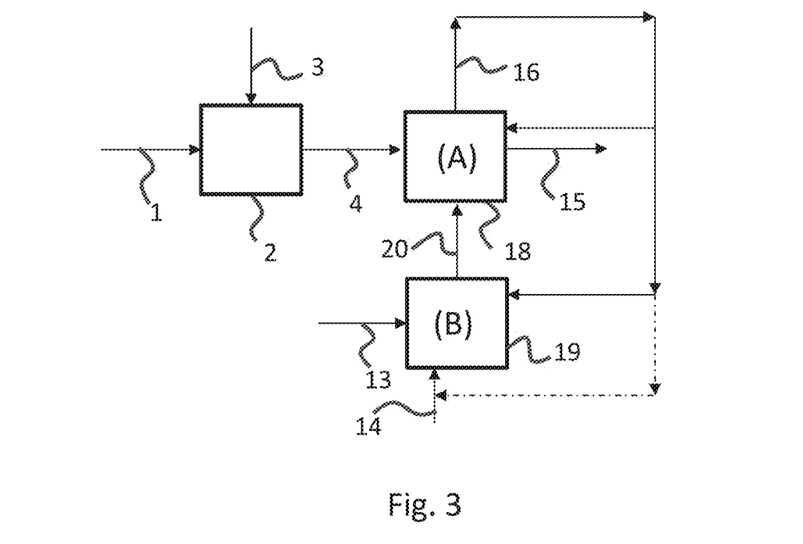
FIG. 3 shows a diagram of the process for adding an organic compound according to a second embodiment.

FIG. 3 is another embodiment of the process for adding the organic compound to a porous solid which differs from that of FIG. 2 in that the unit 11 for bringing the solid together with the liquid organic compound comprises two chambers 18 and 19 which are capable of containing, respectively, the optionally pretreated porous solid 4 and the organic compound in the liquid state, the two chambers being in communication by means of a duct 20 so as to enable solely the passage of a vapor phase containing the organic compound in the gaseous state.

Figure 4:
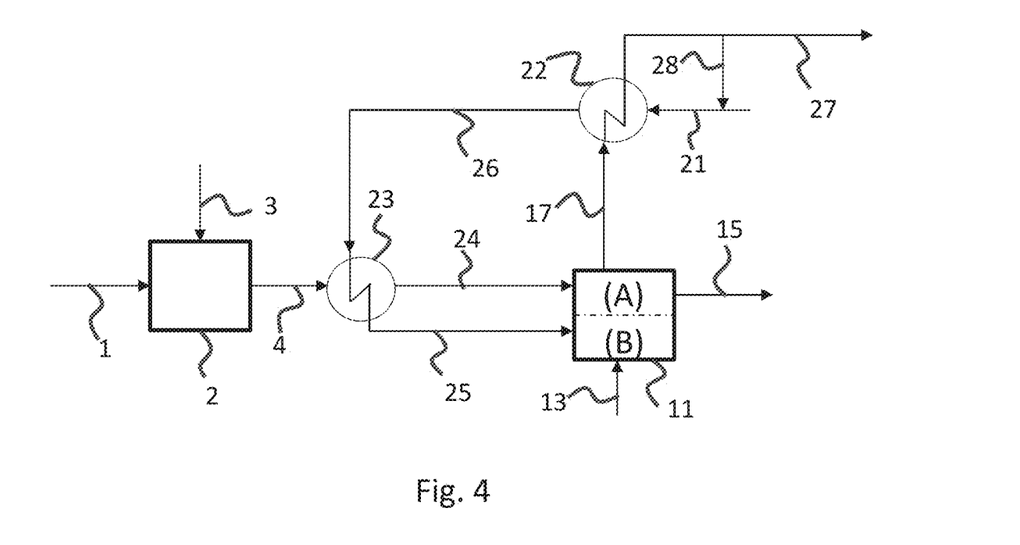
FIG. 4 is a diagram of the process for adding an organic compound according to a third embodiment.

FIG. 4 is a variant of the process for adding an organic compound to a porous solid according to the invention in which the porous solid to be additivated undergoes a heat treatment at a temperature above that of the step of bringing together with the organic compound in the liquid state and in which a heated entraining gas is injected into the bringing-together unit 11.

With reference to FIG. 4, the porous solid 1 undergoes a pre-treatment step which consists of a heat treatment at a temperature which is above the temperature applied in the step of bringing together in the unit 11. The process of FIG. 4 includes a thermal integration procedure that consists in using a carrier gas supplied by the line 21. This carrier gas 21 may be, for example and nonlimitingly, an effluent resulting from another process or a dedicated carrier gas. In the case of a dedicated carrier gas, this carrier gas may be, for example and non-limitingly, carbon dioxide, ammonia, air with a controlled moisture content, an inert gas such as argon, nitrogen, hydrogen, natural gas or a refrigerant gas according to the classification published by IUPAC. The gas is either provided under pressure, or pressurized in order to overcome the pressure drops induced by the circuit by means of equipment for increasing the pressure of a gas such as a compressor or a fan. If the temperature of the carrier gas is below the temperature applied in the step of bringing the solid together with the organic compound in the liquid state, it is advantageous to carry out a heat exchange, for example with an exchanger 22 of feed-effluent type in order to heat the carrier gas 21 with a gaseous effluent 17 resulting from the unit 11 which is described hereinbelow. As shown in FIG. 4, the reheated carrier gas stream 21 is sent via the line 26 into a heat exchanger 23 in which it exchanges heat with the heat-treated solid 4. This heat exchange may take place by direct or indirect contact between the gas and the solid. In the case of direct contact, the heat exchange takes place by contact of the carrier gas 21 with the porous solid 4, for example in a fluidized bed. In the case of indirect contact, it is possible to use a gas/solid exchanger comprising a set of tubes travelled through by the carrier gas which pass through the bed of porous solid. At the end of this heat exchange, there is a stream of cooled porous solid 24 and a stream of reheated carrier gas 25 which are sent to the bringing-together unit 11, respectively to compartment A and compartment B. The supplying of heated carrier gas 25 to the compartment containing the liquid organic compound may take place for example by means of a bubbling device. The role of this hot carrier gas 25 is two-fold: it provides heat as a replacement for or in addition to the temperature-maintaining device for the bringing-together step and it creates a movement of the gas phase of compartment B toward compartment A thus contributing to the transport of the organic compound in the gaseous state to the porous solid to be additivated.

A gaseous effluent 17 which contains the carrier gas and optionally the organic compound in the gaseous state is discharged from compartment A to supply the heat exchanger 22 in order to reheat the carrier gas 21. The cooled gaseous effluent 17 leaving the exchanger 22 is either completely or partly recycled via the line 28 with the carrier gas 21, or is completely discharged from the unit 11 via the line 27.

Besides the recovery of heat, the heat exchange 22 optionally makes it possible, when the cooling of the gaseous effluent 17 is sufficient, to condense a fraction of the organic compound which is entrained by the carrier gas. The condensate may then be recycled to compartment B containing the organic compound in the liquid state.

EXAMPLES

Example 1: Preparation of CoMoP Catalysts on Alumina Without Organic Compound C1 and C2 (Not in Accordance with the Invention)

To an alumina support having a BET surface area of 230 $m^2/g$, a pore volume measured by mercury porosimetry of 0.78 ml/g and a mean pore diameter of 11.5 nm defined as the volume median diameter by mercury porosimetry and which is in "extrudate" form, cobalt, molybdenum and phosphorus are added. The impregnation solution is prepared by dissolving, at 90° C., molybdenum oxide (21.1 g) and cobalt hydroxide (5.04 g) in 11.8 g of an 85 wt % aqueous solution of phosphoric acid. After dry impregnation, the extrudates are left to mature in a water-saturated atmosphere for 24 h at ambient temperature, then they are dried at 90° C. for 16 hours. The dried catalyst precursor thus obtained is denoted by C1. The calcination of the catalyst precursor C1 at 450° C. for 2 hours leads to the calcined catalyst C2. The final metal composition of the catalyst precursor C1 and of the catalyst C2 expressed in the form of oxides and relative to the weight of dry catalyst is then the following: $MoO_3$=19.5±0.2 wt %, CoO=3.8±0.1 wt % and $P_2O_5$=6.7±0.1 wt %.

Example 2: Preparation of the CoMoP Catalyst on Alumina C3 (Not in Accordance with the Invention) by Co-Impregnation To the alumina support described above in example 1 and which is in the "extrudate" form, cobalt, molybdenum and phosphorus are added. The impregnation solution is prepared by dissolving, at 90° C., molybdenum oxide (28.28 g) and cobalt hydroxide (6.57 g) in 15.85 g of an 85 wt % aqueous solution of phosphoric acid. After homogenization of the mixture, 38 g of citric acid were added before adjusting the volume of solution to the pore volume of the support by addition of water. The (citric acid)/Mo molar ratio is equal to 1 mol/mol and the (citric acid)/Co molar ratio is equal to 2.7 mol/mol. After dry impregnation, the extrudates are left to mature in a water-saturated atmosphere for 24 h at ambient temperature, then they are dried at 120° C. for 16 hours. The dried catalyst additivated with citric acid thus obtained is denoted by C3. The final metal composition of the catalyst C3 expressed in the form of oxides and relative to the weight of dry catalyst is then the following: $MoO_3$=19.6±0.2 wt %, CoO=3.7±0.1 wt % and $P_2O_5$=6.7±0.1 wt %.

Example 3: Preparation of the CoMoP Catalyst on Alumina C4 (Not in Accordance with the Invention) by Post-Impregnation 18 g of catalyst precursor C1 described above in example 1 and which is in the "extrudate" form are impregnated with an aqueous solution containing 3.2 g of 2-methoxyethyl 3-oxobutanoate and the volume of which is equal to the pore volume of the catalyst precursor.

The amounts used are such that the amount of 2-methoxyethyl 3-oxobutanoate is 0.8 mol per mole of molybdenum (corresponding to 2.2 mol per mole of cobalt). The extrudates are left to mature in a water-saturated atmosphere for 16 h at ambient temperature. The catalyst precursor C4 is then dried at 120° C. for 2 hours to give the catalyst C4. The final metal composition of the catalyst C4 relative to the weight of dry catalyst is: $MoO_3$=19.5±0.2 wt %, CoO=3.8±0.1 wt % and $P_2O_5$=6.7±0.1 wt %.

Example 4: Preparation of the CoMoP Catalyst on Alumina C5 (According to the Invention) by Introduction of an Organic Compound in the Vapor Phase After the Impregnation of the Metals Arranged in a closed chamber are 4 g of 2-methoxyethyl 3-oxobutanoate contained in a crystallizing dish. 12 g of the catalyst precursor C1 are introduced into the same closed chamber and arranged on a stainless steel grid so that the liquid 2-methoxyethyl 3-oxobutanoate is not in physical contact with the catalyst precursor C1. The closed chamber is placed in an oven at 120° C. for 6 hours. 14.1 g of catalyst C5 are thus obtained after the catalyst precursor C1 has been brought together with the 2-methoxyethyl 3-oxobutanoate compound in the gaseous state. The amount of 2-methoxyethyl 3-oxobutanoate thus transferred to the catalyst is such that the 2-methoxyethyl 3-oxobutanoate/Mo molar ratio is 0.8 mol per mole of molybdenum (corresponding to 2.2 mol per mole of cobalt). The final metal composition of the catalyst C5 relative to the mass of dry catalyst is: $MoO_3$=19.5±0.2 wt %, CoO=3.8±0.1 wt % and $P_2O_5$=6.7±0.1 wt %.

Example 5: Preparation of the CoMoP Catalyst on Alumina C6 (According to the Invention) by Introduction of an Organic Compound in the Vapor Phase Before the Impregnation of the Metals Arranged in a closed chamber are 4 g of 2-methoxyethyl 3-oxobutanoate contained in a crystallizing dish. 8.4 g of the same support as the one used in example 1 are introduced into the same closed chamber and arranged on a stainless steel grid so that the liquid 2-methoxyethyl 3-oxobutanoate is not in physical contact with the support. The closed chamber is placed in an oven at 120° C. for 6 hours. 10.5 g of support additivated with 2-methoxyethyl 3-oxobutanoate are thus obtained. The amount of 2-methoxyethyl 3-oxobutanoate introduced on the support is fixed so as to obtain, after impregnation of the metals, a 2-methoxyethyl 3-oxobutanoate/Mo molar ratio of 0.8 mol per mole of molybdenum (i.e. again 2.2 mol per mole of cobalt).

The modified support is then impregnated by an impregnation solution prepared by dissolving, at high temperature, molybdenum oxide (2.4 g) and cobalt hydroxide (0.6 g) in 1.4 g of an 85 wt % aqueous solution of phosphoric acid, taking care to adjust, by addition of water, the volume of the latter solution to the pore volume of the preceding modified support. After dry impregnation, the extrudates were left to mature in a water-saturated atmosphere for 24 h at ambient temperature, then dried at 120° C. for 16 hours to result in the catalyst C6. The final metal composition of the catalyst C6 relative to the weight of dry catalyst is the following: $MoO_3$=19.8±0.2 wt %, CoO=3.9±0.1 wt % and $P_2O_5$=6.9±0.1 wt %.

Example 6: Evaluation in HDS of Diesel Fuel of the Catalysts C1, C2, C3 and C4 (Not in Accordance with the Invention) and C5 and C6 (in Accordance with the Invention)

The catalysts C1, C2, C3 and C4 (not in accordance with the invention) and C5 and C6 (in accordance with the invention) were tested in HDS of diesel fuel.

The features of the diesel fuel feedstock used are the following:
density at 15° C.=0.8522 g/cm$^3$,
sulfur content=1.44% by weight.
Simulated distillation:
IP: 155° C.
10%:247° C.
50%:315° C.
90%:392° C.
FP:444° C.

The test is carried out in an isothermal crossed fixed-bed pilot reactor, the fluid circulating from bottom to top.

The catalyst precursors are first sulfided in situ at 350° C. in the reactor under pressure by means of the diesel fuel of the test to which 2 wt % of dimethyl disulfide are added.

The hydrodesulfurization tests were carried out under the following operating conditions: a total pressure of 7 MPa, a catalyst volume of 30 cm$^3$, a temperature of from 330 to 360° C., with a hydrogen flow rate of 24 l/h and with a feedstock flow rate of 60 cm$^3$/h.

The catalytic performances of the catalysts tested are given in table 1. They are expressed in degrees Celsius relative to the (comparative) catalyst C2 chosen as a reference (C2): they correspond to the temperature difference to be applied in order to attain 50 ppm of sulfur in the effluent. A negative value signifies that the target sulfur content is attained for a lower temperature and that there is therefore an increase in activity. A positive value signifies that the target sulfur content is attained for a higher temperature and that there is therefore a loss of activity. The results obtained are reported in table 1.

TABLE 1

Isovolumic relative activities in hydrodesulfurization of diesel fuel of the catalysts C1, C2, C3 and C4 (not in accordance with the invention) and C5 and C6 (in accordance with the invention) relative to the catalyst C2 (not in accordance).

| Catalyst (comparative or according to the invention) | Organic compound used and compound/Mo molar ratio | Method of introducing the organic compound | HDS activity |
|---|---|---|---|
| C1 (comp) | none | N/A | Base + 1.0° C. |
| C2 (comp) | none | N/A | Base |
| C3 (comp) | Citric acid - 1.0 mol/mol Mo | Co-impregnation | Base − 2.9° C. |
| C4 (comp) | 2-methoxyethyl 3-oxobutanoate - 0.8 mol/mol Mo | Post-additivation | Base − 5.7° C. |
| C5 (inv) | 2-methoxyethyl 3-oxobutanoate - 0.8 mol/mol Mo | Gas phase after impregnation of the metals | Base − 6.8° C. |
| C6 (inv) | 2-methoxyethyl 3-oxobutanoate - 0.8 mol/mol Mo | Gas phase before impregnation of the metals | Base − 6.6° C. |

Table 1 clearly shows that the method of introducing the organic compound according to the invention makes it possible to avoid the use of a solvent and consequently to avoid a drying step while introducing the adequate amount of organic compound at a temperature far below its boiling point. Specifically, to prepare the catalysts C5 and C6, 2-methoxyethyl 3-oxobutanoate is used at 120° C. while its boiling point at atmospheric pressure is 254° C. Furthermore, the catalysts according to the invention are at least as efficient as those prepared according to the prior art. Specifically, the catalysts C5 and C6 according to the invention are more efficient than all the other comparative catalysts. The increase is very significant in comparison with catalysts that do not use an organic molecule (C1 and C2) or the citric acid (C3) commonly used by those skilled in the art. Furthermore, the catalysts C5 and C6 are more efficient than the catalyst C4 that uses the same organic molecule introduced according to a protocol well known to a person skilled in the art based on a post-additivation in aqueous solution. The organic compound may therefore be introduced according to the invention both before and after the impregnation of the metals forming the active metal phase. These examples therefore indeed showed the feasibility and the relevance of the method of introducing an organic compound according to the invention in particular for preparing catalysts that may have performances at least as high as those of the catalysts of the prior art.

The invention claimed is:

1. A process for adding an organic compound to a porous solid comprising a) placing in proximity the porous solid and the organic compound in liquid state simultaneously and without physical contact between the solid and the organic compound in the liquid state, at a temperature below the boiling point of the organic compound and under pressure and time conditions such that a fraction of said organic compound is transferred gaseously to the porous solid, and after contact with the porous solid recycling gaseous effluent of the organic compound to either the organic compound in liquid state or to contact with the porous solid.

2. The process as claimed in claim 1, wherein a) is carried out by means of a unit for adding said organic compound comprising a first compartment and a second compartment that are in communication so as to allow the passage of a gaseous fluid between the compartments, the first compartment containing the porous solid and the second compartment containing the organic compound in the liquid state.

3. The process as claimed in claim 2, wherein the unit comprises a chamber that includes the first and second compartments, the two compartments being in gaseous communication.

4. The process as claimed in claim 2, wherein the unit comprises two chambers that respectively form the first and second compartments, the two chambers being in gaseous communication.

5. The process as claimed in claim 2, wherein a) is carried out in the presence of a stream of a carrier gas flowing from the second compartment into the first compartment.

6. The process as claimed in claim 1, wherein a) is carried out at an absolute pressure of between 0 and 1 MPa.

7. The process as claimed in claim 2, wherein, in a), a gaseous effluent containing said organic compound is withdrawn from the first compartment and the effluent is recycled to the first and/or the second compartment.

8. The process as claimed in claim 2, wherein, in a), a gaseous effluent containing said organic compound in the gaseous state is withdrawn from the first compartment, said effluent is condensed so as to recover a liquid fraction containing the organic compound in the liquid state and said liquid fraction is recycled to the second compartment.

9. The process as claimed in claim 1, wherein the porous solid is chosen from a catalyst support and a catalyst support further comprising at least one metal from group VIB and/or at least one metal from group VIII.

10. The process as claimed in claim 9, wherein the porous support is based on an oxide of a metal and/or of a metalloid.

11. The process as claimed in claim 10, wherein the porous support is based on alumina and/or silica.

12. The process as claimed in claim 1, wherein the organic compound is chosen from organic molecules containing oxygen and/or nitrogen and/or sulfur.

13. A process for preparing a catalyst comprising a porous support, at least one metal from group VIB and/or at least one metal from group VIII and at least one organic compound, the process comprising at least the following:
   i) depositing the organic compound on the porous support using the process as claimed in claim 1;
   ii) depositing at least one metal from group VIB and/or at least one metal from group VIII on the porous support by bringing the support into contact with the solution containing at least one precursor of said metal(s) from group VIII and/or at least one precursor of said metal(s) from group VIB;

iii) drying the solid obtained at the end of ii), step i) being carried out before or after ii) and iii).

14. The process as claimed in claim 13, wherein the solution of ii) further comprises at least one additional organic compound different from the organic compound used in i).

15. The preparation process as claimed in claim 13, further comprising at least one impregnation of the porous support with a solution comprising an organic compound different from the organic compound used in i).

16. A process for treating a hydrocarbon feedstock wherein hydrogen, the hydrocarbon feedstock and a catalyst are brought into contact, at a temperature between 180° C. and 450° C., at a pressure between 0.5 and 30 MPa, with an hourly space velocity of between 0.1 and 20 $h^{-1}$ and with a hydrogen/feedstock ratio expressed as volume of hydrogen, measured under normal temperature and pressure conditions, per volume of liquid feedstock of between from 50 l/l to 5000 l/l, said catalyst having been prepared by a process as claimed in claim 13 and subjected to at least one sulfiding process.

* * * * *